No. 616,803. Patented Dec. 27, 1898.
W. PEARCE & G. WALKER.
NAIL PULLER.
(Application filed Sept. 19, 1898.)
(No Model.)
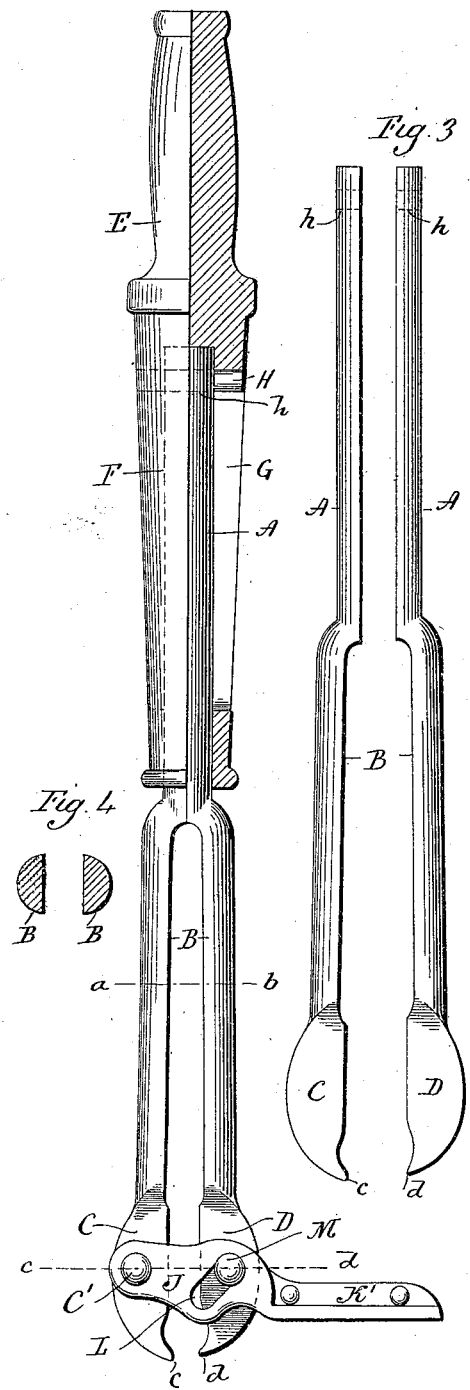
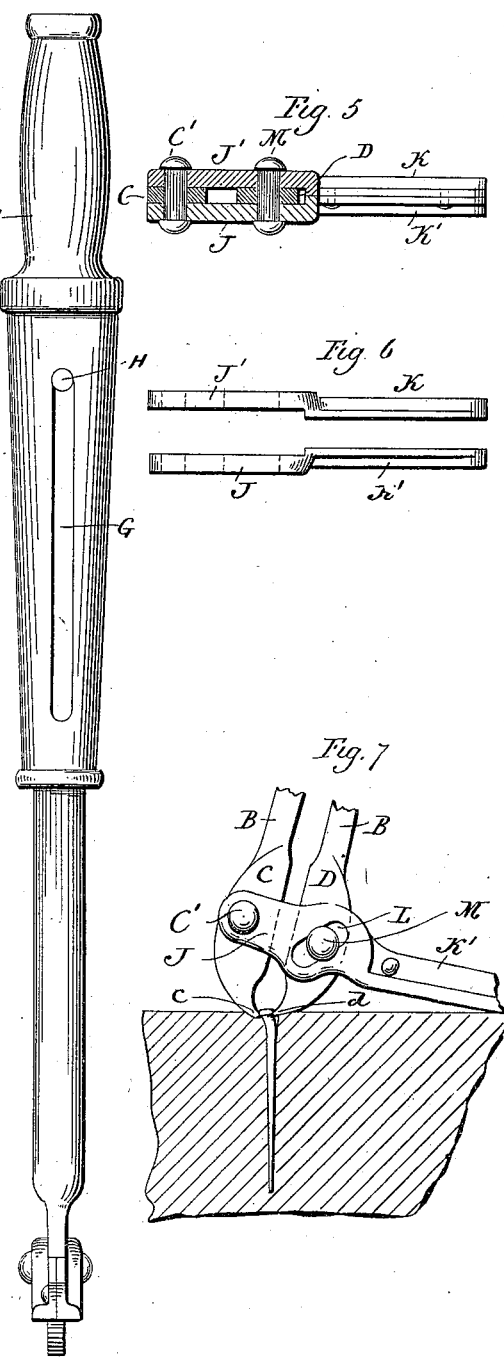

UNITED STATES PATENT OFFICE.

WILLIAM PEARCE AND GEORGE WALKER, OF SOUTHINGTON, CONNECTICUT, ASSIGNORS OF ONE-HALF TO MERRITT N. WOODRUFF AND NORMAN A. BARNES, OF SAME PLACE.

NAIL-PULLER.

SPECIFICATION forming part of Letters Patent No. 616,803, dated December 27, 1898.

Application filed September 19, 1898. Serial No. 691,295. (No model.)

*To all whom it may concern:*

Be it known that we, WILLIAM PEARCE and GEORGE WALKER, of Southington, in the county of Hartford and State of Connecticut, have invented a new Improvement in Nail-Pullers; and we do hereby declare the following, when taken in connection with the accompanying drawings and the letters of reference marked thereon, to be a full, clear, and exact description of the same, and which said drawings constitute part of this specification, and represent, in—

Figure 1, a side view, partially in section, of a nail-puller constructed in accordance with our invention; Fig. 2, a rear view of the same; Fig. 3, a side view of the jaws separated from each other and illustrating the manner of construction; Fig. 4, a sectional view on the line $a\,b$ of Fig. 1; Fig. 5, a sectional view on the line $c\,d$ of Fig. 1; Fig. 6, a top view of the foot detached; Fig. 7, a side view of the lower end of the puller, illustrating its operation.

This invention relates to an improvement in nail-pullers, and particularly to that class which comprise a pair of jaws, a shank, and a sliding handle on the shank, by means of which the jaws are closed upon the head of the nail, the object of the invention being a simple construction and arrangement of jaws which will not only enable the device to be constructed at a lower cost, but will increase the gripping power of the puller; and it consists in certain details of construction and combinations of parts, as will be hereinafter described, and particularly recited in the claims.

The jaws and shank are formed from two strips of half-round metal of suitable length to form a shank portion A, offset near the center to form what we will term the "truss" portion B, and jaws C D, the point $c$ of the jaw C being slightly longer than the point $d$ of the jaw D, as is usual in nail-pullers of this class. The said jaws are formed by transversely flattening the ends of the strips and so as to set their inner edges slightly inward to complete the truss portion B. The two sections A of the shank are riveted or otherwise secured together so as to form a round shank. Over this shank is placed a handle E, having an open socket F, as usual with nail-pullers, except that we prefer to form the socket portion on opposite sides with slots G and through these slots insert a pin H, which extends through holes $h$, formed near the upper ends of the shank members and of sufficient length so that its ends will stand in the slots G, which prevents the withdrawal of the handle, but permits the pin to be conveniently inserted after the handle has been placed over the shank. To the jaw C a foot is connected by a pin or stud $C'$. The foot preferably consists of two plates J J', having inset ends K K' adapted to be riveted together and so that the plates J J' will pass on opposite sides of the jaws. In the plates J J' are inclined slots L, and extending through these slots and fixed to the jaw D is a pin or stud M so located that as the jaws are turned or the foot lifted the slot will ride forward over the pin and force the jaws together.

The operation of the device is as follows: The jaws are placed on opposite sides of a nail, with the outer end of the foot suitably supported. The handle is then forced downward, the shank being slightly inclined, and so that the pin M will ride down in the slots L, and so draw the jaws together and force the nose $c$ of the jaw C into the wood and below the upper end of the nail. In thus forcing the jaws downward the nose $d$ of the jaw D slightly bends the upper end of the nail forward; but when the shank is pulled backward in withdrawing the nail the pressure upon the nail is in the opposite direction from the downward pressure, and so that the upper end of the nail is bent back into its former straight position, the nail being otherwise gripped and withdrawn in the usual manner. As soon as the nail is released the jaws under their natural spring will separate and so normally stand in the open position.

The particular object of forming the truss portion B aside from producing a spring is to prevent bending, for the reason that when the jaws are closed together the tendency of either member is against its greatest resistance and each is reinforced by the other, and so that a stronger shank is secured by the two half-round members than would be obtained by a solid round shank.

It is apparent without further illustration that the foot may be formed in a single piece and that the handle may be connected with the shank in various ways. It will also be seen that by forming the shank and jaws as herein shown and described they are readily formed in drop-presses, and that practically no fitting is required, and that no spring other than the natural spring of the metal is required to throw the jaws open.

Having fully described our invention, what we claim as new, and desire to secure by Letters Patent, is—

1. A nail-puller having the lower portion of its shank bifurcated and the lower ends thereof formed with jaws, the bifurcated ends oppositely offset at their upper ends from the upper portion of said shank, whereby a truss is formed between the upper end of the shank and the jaws, and a foot pivotally connected with one jaw and having a pin-and-slot connection with the other jaw, substantially as described.

2. A nail-puller having its shank and jaws formed from two strips of metal connected at their upper ends, and each formed with oppositely-offset lower portions terminating in transversely-flattened jaws, and a foot pivotally connected with one jaw and formed with a slot for engagement with a stud on the other jaw, substantially as described.

3. A nail-puller having its shank and jaws formed from two strips of half-round metal, said jaws transversely flattened, and the metal between the jaws and the upper end of the shank reversely offset so as to separate the adjacent faces and form a truss between the jaws and the shank, and a foot pivotally connected with one jaw and formed with a slot for engagement with a pin on the opposite jaw, whereby the upward movement of the foot forces the jaws together, substantially as described.

In testimony whereof we have signed this specification in the presence of two subscribing witnesses.

WILLIAM PEARCE.
GEORGE WALKER.

Witnesses:
RICHARD ELLIOTT,
CORNELIUES MCNERNEY.